(12) United States Patent
Payne

(10) Patent No.: US 7,742,069 B2
(45) Date of Patent: Jun. 22, 2010

(54) TELEPHONE RING ACTIVATION OF A WIRELESS TRANSMITTER FOR REMOTE CONTROL OF A TELEVISION

(76) Inventor: Nicholas William Prideaux Payne, 68 Reservoir Rd., New Milford, CT (US) 06776

( * ) Notice: Subject to any disclaimer, the term of this patent is extended or adjusted under 35 U.S.C. 154(b) by 891 days.

(21) Appl. No.: 11/381,161

(22) Filed: May 2, 2006

(65) Prior Publication Data
US 2008/0019491 A1 Jan. 24, 2008

Related U.S. Application Data

(60) Provisional application No. 60/594,756, filed on May 3, 2005.

(51) Int. Cl.
*H04N 7/14* (2006.01)
(52) U.S. Cl. ........................ 348/14.01; 725/81
(58) Field of Classification Search ............... 455/556.1; 725/81, 128, 106, 32–33; 348/731, 14.01–14.08; 379/76–93.01
See application file for complete search history.

(56) References Cited

U.S. PATENT DOCUMENTS

| | | | |
|---|---|---|---|
| 5,056,153 A * | 10/1991 | Taniguchi et al. | ........ 455/556.1 |
| 5,528,673 A | 6/1996 | Rosenthal | |
| 6,141,058 A | 10/2000 | Lagoni et al. | |
| 6,209,025 B1 * | 3/2001 | Bellamy | ........................ 725/106 |
| 6,263,503 B1 * | 7/2001 | Margulis | ...................... 725/81 |
| 6,337,719 B1 * | 1/2002 | Cuccia | ........................ 348/731 |
| 6,529,742 B1 * | 3/2003 | Yang | ........................ 455/556.1 |
| 6,570,974 B1 * | 5/2003 | Gerszberg et al. | ....... 379/218.01 |
| 6,795,531 B2 * | 9/2004 | Jursinski et al. | ............... 379/76 |
| 6,836,898 B1 * | 12/2004 | Yates et al. | ................. 725/128 |

\* cited by examiner

*Primary Examiner*—Curtis Kuntz
*Assistant Examiner*—Maria El-Zoobi
(74) *Attorney, Agent, or Firm*—Gordon & Jacobson, PC

(57) ABSTRACT

An apparatus and method for use with a television and a telephone line. In response to reception of a ring signal carried on the telephone line, at least one stored remote control command (e.g., "mute") is wirelessly transmitted to the television for effectuating remote control operations of the television in conjunction with the ring signal being carried on the telephone line. Preferably, the electrical energy of the ring signal is converted to appropriate DC voltage levels to power on component(s) of the apparatus where permitted. The at least one remote control command is preferably supplied by operation of a wireless remote control unit and stored in non-volatile memory for subsequent transmission.

9 Claims, 4 Drawing Sheets

US 7,742,069 B2

TELEPHONE RING ACTIVATION OF A WIRELESS TRANSMITTER FOR REMOTE CONTROL OF A TELEVISION

CROSS-REFERENCE TO RELATED APPLICATIONS

This application claims benefits from U.S. Provisional Patent Application No. 60/594,756 filed May 3, 2005, the contents of which are hereby incorporated herein by reference.

BACKGROUND OF THE INVENTION

1. Field of the Invention

This invention relates to mechanisms for generating an alert notification of an incoming telephone call suitable for the hard of hearing or deaf.

2. State of the Art

It is difficult for those that are hard of hearing or deaf to be alerted of an incoming call by a traditional telephone ring. Several devices have been developed that provide additional mechanisms for alerting a hard of hearing user to an incoming telephone call.

One such device, which is sold commercially under the name "Teleflash", generates an amplified audible sound and strobe light to alert an individual of an incoming phone call. The device detects the incoming phone call by a piezo microphone that is placed under a phone and is powered by connection to mains power.

Another such device, which is sold commercially under the name "Silent Call Indicator", generates a bright flash to alert an individual of an incoming phone call. The device interfaces to a standard telephone socket in order to detect the incoming phone call and is powered by connection to mains power.

Hard of hearing people often maintain the television volume at a high level. In these situations, the prior art devices require a line of site between the device and the user in order effectively alert the user of the incoming telephone call. This line of site may not be practical in many situations. Moreover, the visual alerts generated by the prior art devices can be ineffective in grabbing the attention of the user and can also be cumbersome because the user is required to take further steps to lower the volume of the television in order to take the incoming call.

Thus, there remains a need in the art for improved mechanisms for alerting a hard of hearing or deaf user to an incoming telephone call, especially in a noisy environment where the television volume is maintained at a high level.

SUMMARY OF THE INVENTION

It is therefore an object of the invention to provide a mechanism that effectively and efficiently alerts a hard of hearing user to an incoming telephone call, especially in a noisy environment where the television volume is maintained at a high level.

It is another object of the invention to provide such a mechanism that can be customized by the user as desired to provide for effective call notification.

It is a further object of the invention to provide such a mechanism that can be quickly and easily installed by users with varying use requirements and installation requirements.

In accord with these objects, which will be discussed in detail below, an apparatus and method are provided for use with a television and a telephone line. In response to the reception of a ring signal carried on the telephone line, at least one stored remote control command (e.g., "mute" command) is wirelessly transmitted to the television for effectuating remote control operations of the television in conjunction with the ring signal being carried on the telephone line. Preferably, the electrical energy of the ring signal is converted to appropriate DC voltage levels to power on component(s) of the apparatus where permitted. The at least one remote control command is preferably supplied by operation of a wireless remote control unit and stored in non-volatile memory for subsequent transmission.

It will be appreciated that such device and methodology enable a hard of hearing user, who might turn up the volume of the television, to be alerted to the incoming telephone call.

In one embodiment, the apparatus is realized by two distinct parts that interface to one another over a wireless communication interface therebetween. The first part is interfaced to the telephone line and preferably sends a coded radio frequency signal to the second part upon receiving a ring signal on the telephone line. The second part receives the signal wireless communicated from the first part and operates in response thereto to wirelessly transmit the stored remote control command (e.g., "mute" command) to the television for effectuating remote control operations of the television in conjunction with the ring signal being carried on the telephone line. This "two-part" design provides for greater flexibility in certain installations.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
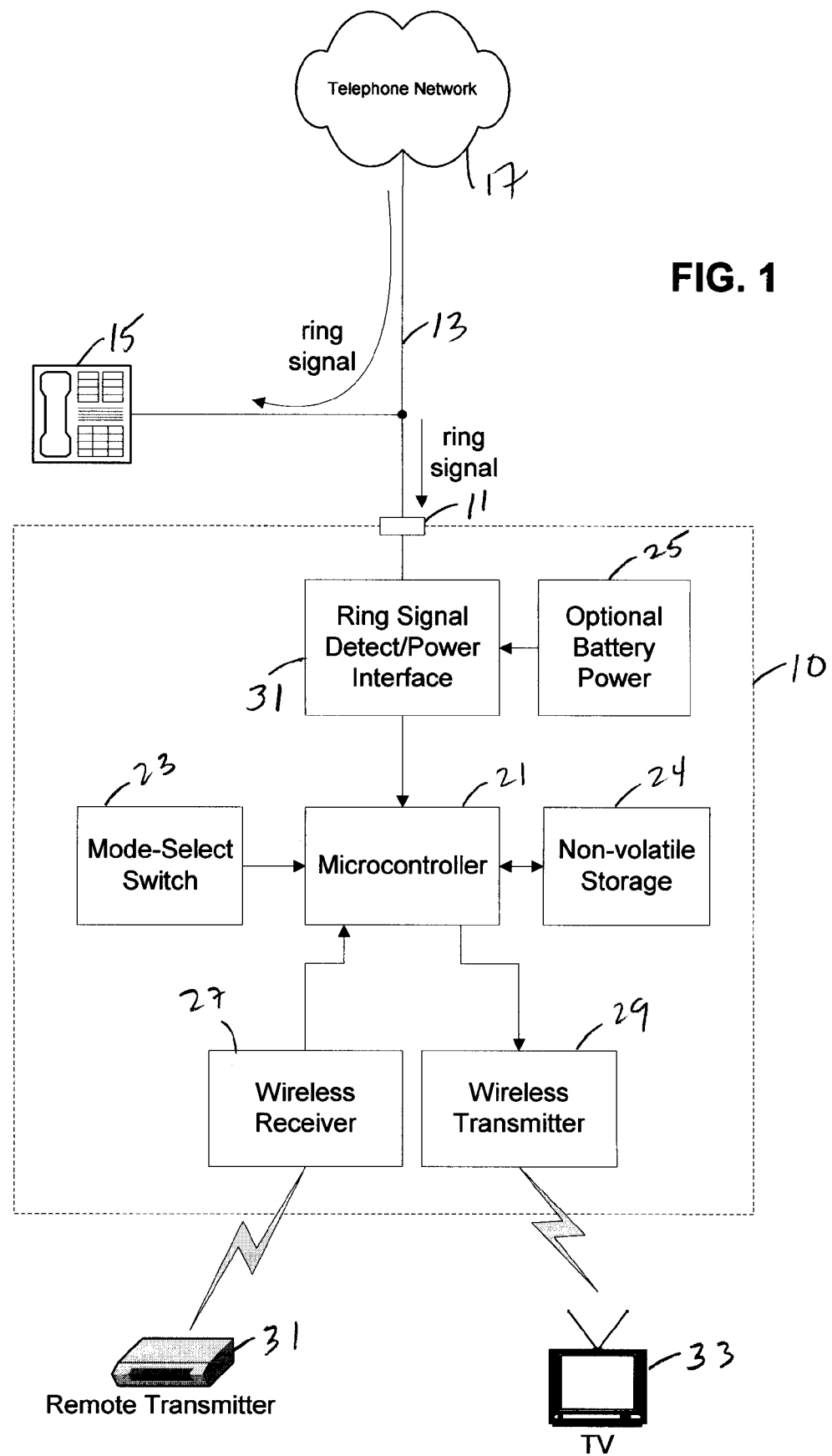
FIG. 1 is a schematic diagram of an exemplary embodiment of the apparatus of the present invention and the environment in which it is used.

Turning now to FIG. 1, there is shown a functional block diagram of a device for generating an alert notification of an incoming telephone call in accordance with the present invention. The device 10 includes a port 11 that interfaces to a telephone line 13 which provides telephony services between one or more telephones 15 (one shown for simplicity of description) and a telephone network 17. The telephone network 17 transmits a ring signal over the telephone line 13 to announce an incoming telephone call. The ring signal is an alternating current waveform, typically at 20 HZ in the United States and 16.67 Hz in Europe. The voltage of the ring signal on the telephone line 13 depends upon the length of line 13 and the number of telephones attached to the telephone line 13, but typically varies between 40 and 150 Volts. The timing of the ring signal varies over telephone networks. The telephone network 17 is typically realized by a local loop (of which the telephone line 13 is part) that is connected to a central office switching device managed by a telephone company. Alternatively, the telephone network 17 can be realized by a VOIP gateway device that interfaces the one or more telephone devices 15 to an IP network (e.g., the Internet) to carry voice call data over the IP network as is well known.

The device 10 includes a microcontroller 21 and supporting components that operate in one of two modes of operation (i.e., "record" mode and "play" mode) as dictated by a mode-select switch 23. The mode-select switch 23 can be automatic or manually-operated. The automatic mode-select switching can be accomplished by monitoring the power levels generated by the circuit block 31. For the "record" mode where a battery powers the device, the voltage appears immediately. In contrast, for the "play" mode where the ring signal powers the device, the voltage produced by the ring signal builds up over time (e.g., a second or two) due to the limited current available in the ring signal. The manually-operated mode-select switching can be accomplished by manual operation of the mode-select switch between a "record" mode switch position and a "play" mode switch position. These two modes are described in more detail below.

With the mode-select switch 23 in the "record" mode, the microcontroller 21 and supporting circuitry (circuit blocks 24, 27, 29) are preferably powered by a battery 25 or possibly mains power after suitable AC-DC power conversion (not shown). In this configuration, the port 11 of the device 10 need not be coupled to the telephone line 11 for the "record" mode. Alternatively, the battery 25 may be omitted and replaced by a momentary switch that enables the device 10 to go "off hook" and power the microcontroller 21 and supporting circuitry (circuit blocks 24, 27, 29) from the power supplied to the telephone line 11. The microcontroller 21 interfaces to a wireless receiver 27 and to a wireless transmitter 29. These interfaces may utilize a serial-type interface, a parallel-type interface, and/or a general purpose I/O interface that are realized on the microcontroller 21.

In the "record" mode, the microcontroller 21 cooperates with a wireless receiver 27 to receive one or more commands transmitted wirelessly from a wireless remote control transmitter 31. The command(s) received by operation of the wireless receiver 27 is stored in non-volatile memory 24, which is preferably realized by flash semiconductor memory.

The wireless remote control transmitter 31 interfaces wirelessly to a television 33 (or a set top box or other control function operably coupled thereto) to remotely control the operation of the television, such as turning the television on or off, changing the channel up or down, changing the channel to a designated channel number, muting the audio volume, raising or lowering the audio volume, invoking setup menus that enable user control of various parameters such as brightness, contrast, saturation, etc.

The particular command(s) transmitted by the wireless remote control transmitter 31 and received and stored by the device 10 in the "record" mode is dictated by the user. It can be any of the commands supported by the wireless interface between the wireless remote control transmitter 31 and the television 33 (or set top box or control function coupled thereto). It is preferable that the particular command selected by the user be effective in capturing the attention of the user when watching the television. For simplicity of description, it is assumed that the particular command selected by the user mutes the audio volume of the television 33. This command is useful because it aids the user in hearing the ring announcement for the incoming phone call on the telephone 15.

Preferably, the microcontroller 21 cooperates with wireless transmitter circuitry 29 to wirelessly transmit the command recorded and stored in the non-volatile memory 24. Such transmission is preferably repeated on a period basis (e.g., every two seconds) for a predetermined time period or possibly until the device is powered down (i.e., the battery power source is disconnected from the device). This allows the user to verify that the particular command has been correctly recorded and actually controls the television 33 as desired (i.e., the TV is actually muted). It also allows the user to place the device 10 in a location such that when it is in "play" mode, it will control the television 33 as desired. Because the command is stored in the non-volatile memory 24, the battery 25 can be removed, if need be, and the command will be retained.

The wireless remote control transmitter 31 typically interfaces to the television 33 (or set top box or other control function) via transmission of infra-red wireless signals. Accordingly, the wireless receiver 27 and the wireless transmitter 29 of the device 10 are preferably capable of respective reception and transmission of such infra-red signals. Alternatively, other wireless signals (such as coded radio-frequency (RF) wireless signals) can be supported.

When the user operates the mode-select switch 23 to select the "play" mode, the port 11 is connected to the telephone line 13. A circuit block 31, which interfaces to the telephone line 13 via the port 11, receives the ring signal transmitted on the telephone line and converts the electrical energy in the ring signal to an appropriate DC voltage level that powers on the microcontroller 21 and the supporting circuitry of blocks 24 and 29. Upon power up in "play" mode, the microcontroller 21 cooperates with the wireless transmitter 29 to transmit the one or more commands recorded and stored in the non-volatile memory 24 during "record" mode for communication to the television 22. In this manner, the particular command(s) recorded during the "record" mode is transmitted to the television 33 in response to the ring signal generated on the telephone line 13. Thus, if the particular command(s) recorded during the "record" mode is the "TV mute" command, the television 33 would be muted when the telephone (s) 15 rings.

The device 10 can also include a second port (not shown) that is connected internally to the port 11. The user can connect telephony equipment (e.g., the telephone 15) to this second port, which connects such equipment to the telephone line 13 connected thereto via port 11.

Advantageously, the device 10 allows a hard of hearing user, who might turn up the volume of the television 22, to be alerted to the incoming telephone call.

Figure 2:
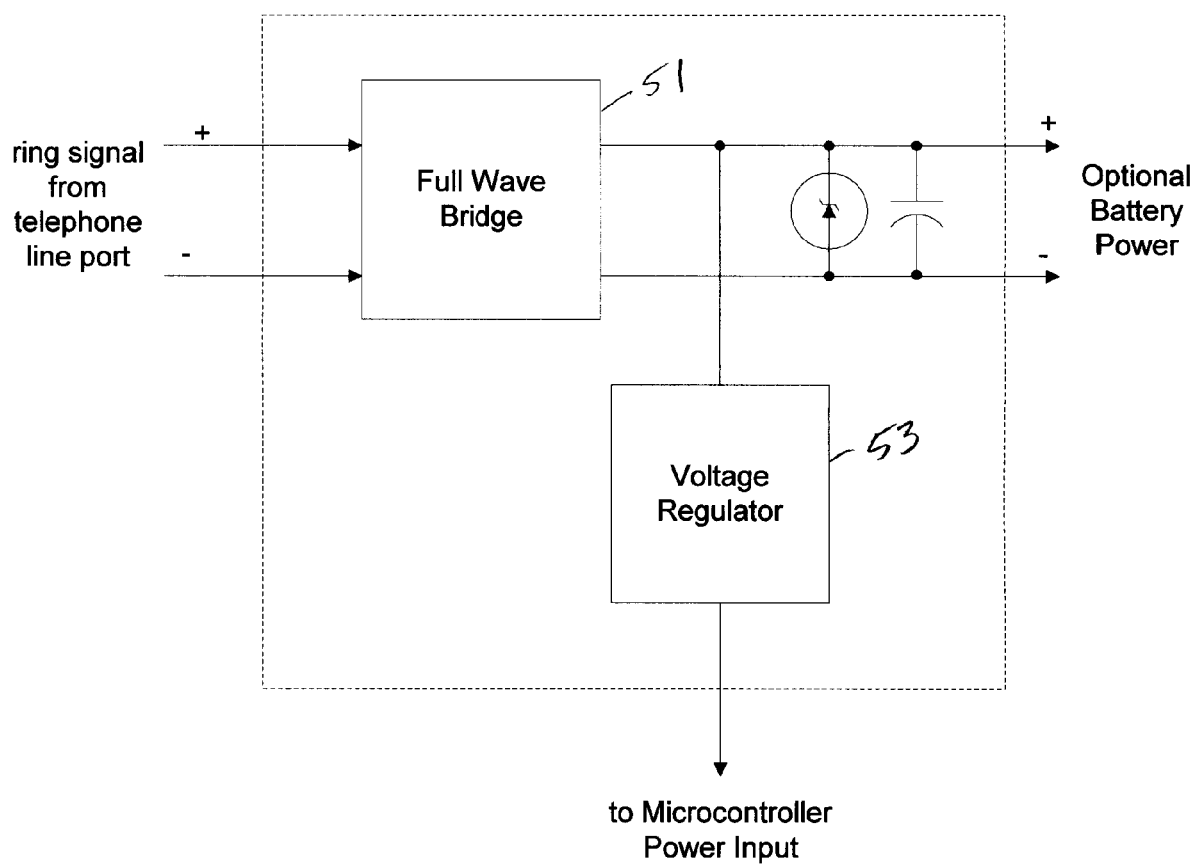
FIG. 2 is a functional block diagram of an exemplary embodiment of the circuit block 31 of FIG. 1.

FIG. 2 shows an exemplary embodiment of the circuit block 31 of FIG. 1. It includes a bridge rectifier 51 that achieves full-wave rectification of the AC signal waveform of the ring signal. The rectified voltage levels (typically around 12 volts) are stored on the capacitor 55. A voltage regulator 53 converts and regulates the voltage levels stored on the capacitor 55 to an appropriate DC voltage level (typically on the order of 5 volts) that is appropriate for powering on the microcontroller 21 and the supporting circuitry of block 24. The circuit block 53 also preferably includes a flyback converter for supplying the appropriate DC voltage level (typically on the order of 1.2V) to the wireless transmitter block 29. The output of the circuit block 53 is supplied to the DC power input of the microcontroller as well as to DC power inputs of the supporting circuitry of blocks 24 and 29 for powering on these components in the "play" mode. The zener diode 57 limits the maximum voltage that can appear across the storage capacitor 55.

Note that in the "play" mode, the battery 25 is removed and the device is connected to the telephone line 13. In this configuration, the battery 25 and the telephone line connection are not present at the same time, which allows the battery 25 to be connected to the input of the voltage regulator 53 in parallel with the output of the bridge rectifier 51 as shown in FIG. 2.

Figure 3:
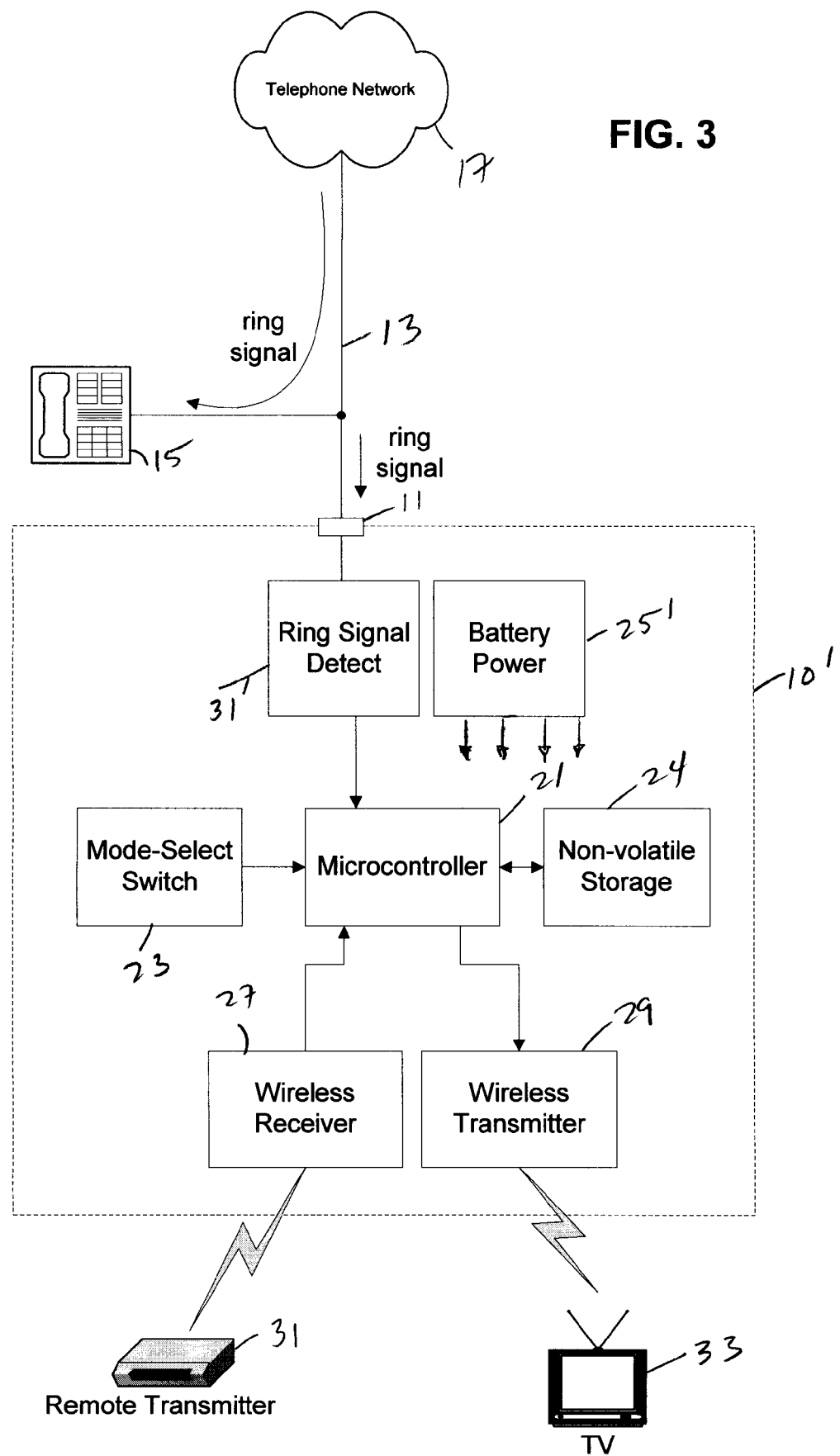
FIG. 3 is a schematic diagram of an alternate embodiment of the apparatus of the present invention and the environment in which it is used.

FIG. 3 illustrates an alternate embodiment of the invention whereby the electrical components of the device 10' are powered in both the "record" and "play" modes by a battery 25' or possibly by mains power after suitable AC-DC power conversion (not shown). In this configuration, the circuit block 31' is adapted to receive and detect the ring signal on the telephone line 13 and convey the detection of the ring signal to the microcontroller 21 via an interface therebetween (e.g., by raising an interrupt assigned to the interface therebetween or by other suitable means). When the microcontroller receives the ring signal detect event conveyed by the circuit block 31', the microcontroller 21 cooperates with the wireless transmitter 29 to transmit the one or more commands recorded and stored in the non-volatile memory 24 during "record" mode for communication to the television 22. In this manner, the particular command(s) recorded during the "record" mode is transmitted to the television 33 in response to the ring signal generated on the telephone line 13. Thus, if the particular command(s) recorded during the "record" mode is the "TV mute" command, the television 33 would be muted when the telephone(s) 15 rings.

Figure 4:
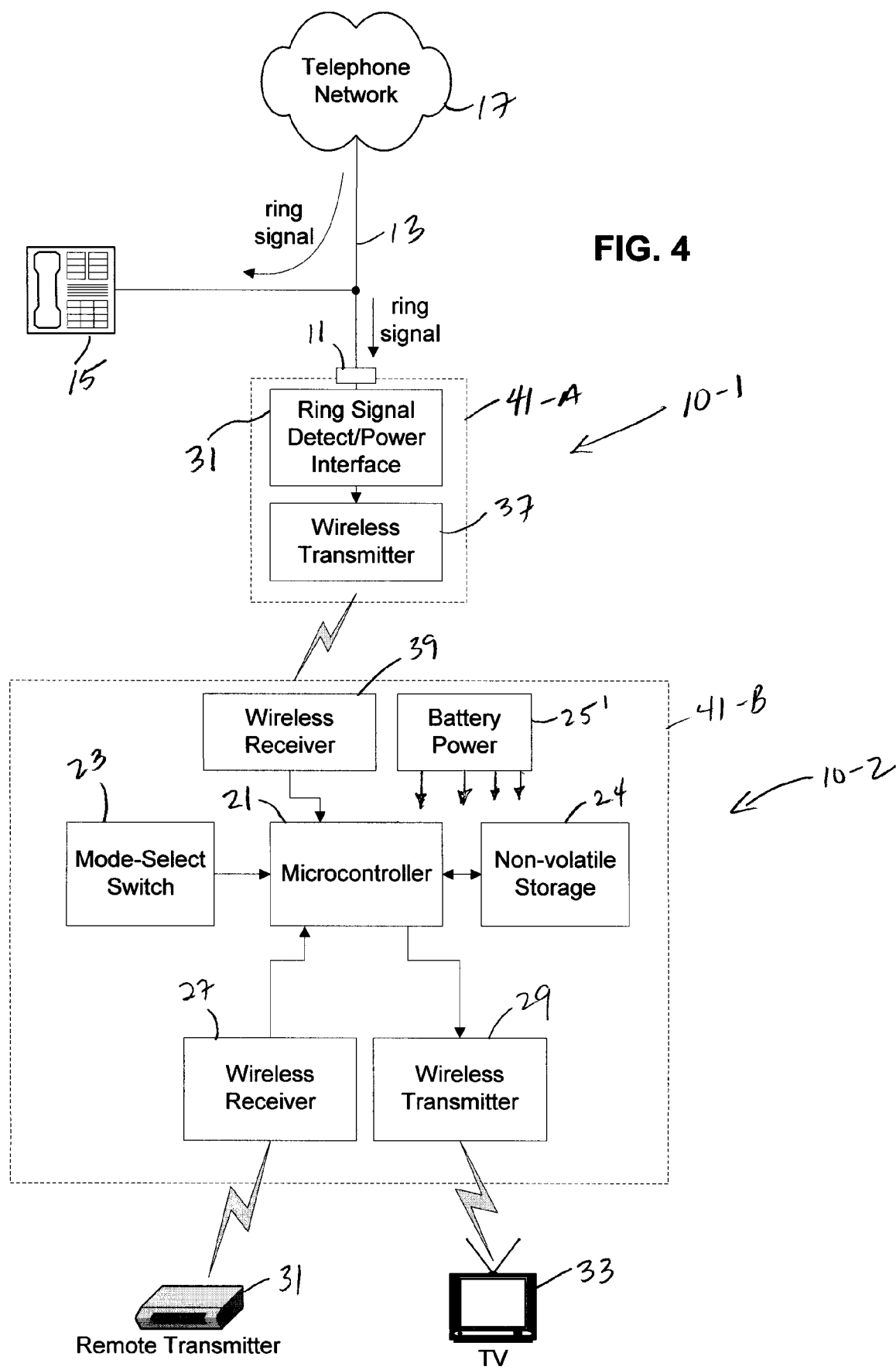
FIG. 4 is a schematic diagram of another alternative embodiment of the apparatus of the present invention and the environment in which it is used.

In an alternate embodiment shown in FIG. 4, the device is split into two distinct parts 10-1 and 10-2. The first part 10-1 includes a housing 41A that houses the port 11, circuit block 31 and a wireless transmitter 37. The port 11 is connected to the telephone line 13 preferably by a pigtail connection of a few inches long that plugs into a telephone wall socket. The circuit block 31, which interfaces to the telephone line 13 via the port 11, receives the ring signal transmitted on the telephone line 13 and converts the electrical energy in the ring signal to an appropriate DC voltage level that powers on the wireless transmitter 37. In the powered on state, the wireless transmitter 37 transmits a wireless signal for reception by the wireless receiver 39 of the second part 10-2. In the preferred embodiment, the wireless transmitter 37 transmits a coded RF signal that represents a unique code. This code can be set at the factory or could be set by small switches mounted on the part 10-1. The first part 10-1 can also include a second port (not shown) that is connected internally to the port 11. The user can connect telephony equipment (e.g., the telephone 15) to this second port, which connects such equipment to the telephone line 13 connected thereto via port 11.

The second part 10-2 includes a housing 10-B that houses the wireless receiver 39 and microcontroller 21. The microcontroller 21 interfaces to a wireless receiver 27 and to a wireless transmitter 29. These interfaces may utilize a serial-type interface, a parallel-type interface, and/or a general purpose I/O interface that are realized on the microcontroller 21. The electrical components of the second part 10-2 are powered by a battery 25' or possibly mains power after suitable AC-DC power conversion (not shown). The microcontroller 21 and the supporting components operate in one of two modes of operation (i.e., "record" mode and "play" mode) as dictated by a mode-select switch 23. The mode-select switch 23 is manually operated between a "record" mode switch position and a "play" mode switch position. These two modes are described in more detail below.

With the mode-select switch 23 in the "record" mode, the wireless receiver 39 is adapted to receive and record (e.g., learn) information contained in the wireless signal transmitted by the wireless transmitter of the first part 10-1. To trigger the transmission of this wireless signal, the user preferably places a call to the telephone line to activate the transmission of the wireless signal by the transmitter 37. The wireless receiver 39 preferably stores the information in its non-volatile memory. In the "record" mode, the microcontroller 21 cooperates with a wireless receiver 27 to receive one or more commands transmitted wirelessly from a wireless remote control transmitter 31. The command(s) received by operation of the wireless receiver 27 is stored in non-volatile memory 24, which is preferably realized by flash semiconductor memory. The particular command(s) transmitted by the wireless remote control transmitter 31 and received and stored by the device 10 in the "record" mode is dictated by the user. It can be any of the commands supported by the wireless interface between the wireless remote control transmitter 31 and the television 33 (or set top box or control function coupled thereto). It is preferable that the particular command selected by the user be effective in capturing the attention of the user when watching the television. For simplicity of description, it is assumed that the particular command selected by the user mutes the audio volume of the television 33. This command is useful because it aids the user in hearing the ring announcement for the incoming phone call on the telephone 15.

In the "record" mode, the microcontroller 21 preferably cooperates with wireless transmitter circuitry 29 to wirelessly transmit the command recorded and stored in the non-volatile memory 24. Such transmission is preferably repeated on a period basis (e.g., every two seconds) for a predetermined time period. This allows the user to verify that the particular command has been correctly recorded and actually controls the television 33 as desired (i.e., the TV is actually muted). It also allows the user to place the device 10 in a location such that when it is in "play" mode, it will control the television 33 as desired. Because the command is stored in the non-volatile memory 24, the battery 25 can be removed, if need be, and the command will be retained.

The wireless remote control transmitter 31 typically interfaces to the television 33 (or set top box or other control function) via transmission of infra-red wireless signals. Accordingly, the wireless receiver 27 and the wireless transmitter 29 of the device 10 are preferably capable of respective reception and transmission of such infra-red signals. Alternatively, other wireless signals (such as coded radio-frequency (RF) wireless signals) can be supported.

With the mode-select switch 23 in the "play" mode, the wireless receiver 39 is adapted to receive the wireless signal transmitted by the wireless transmitter of the first part 10-A and confirm that the received wireless signal carries the information stored in its non-volatile memory. This feature is useful for certain applications (such as in apartment buildings) where like or similar frequency signals can be present and interfere with the operation of the device. In order to save power, the wireless receiver is preferably powered on several times a second but only for very brief periods, which are just long enough to detect a signal from the wireless transmitter 37. If the wireless receiver 39 detects a signal, it will remain powered on for a period that allows for full detection of the wireless signal transmitted by the wireless transmitter 37.

Upon reception and confirmation of the wireless signal transmitted by the wireless transmitter of the first part 10-A, the wireless receiver 39 conveys this event to the microcontroller 21 via an interface therebetween (e.g., by raising an interrupt assigned to the interface therebetween or by other suitable means). When the microcontroller receives this event as conveyed by the wireless receiver 39, the microcontroller 21 cooperates with the wireless transmitter 29 to transmit the one or more commands recorded and stored in the non-volatile memory 24 during "record" mode for communication to the television 22. In this manner, the particular command(s)

recorded during the "record" mode is transmitted to the television 33 in response to the ring signal generated on the telephone line 13. Thus, if the particular command(s) recorded during the "record" mode is the "TV mute" command, the television 33 would be muted when the telephone(s) 15 rings.

Advantageously, this "split-part" design provides for greater flexibility in certain installations, such as those where a telephone jack is not readily available near the television viewing area. In these situations, the first part can be located adjacent the telephone jack and the second part located remotely therefrom in the television viewing area.

There have been described and illustrated herein several embodiments of an apparatus and corresponding method that receives a ring signal that announces an incoming telephone call and activates a wireless transmitter for remote control of television in response thereto. While particular embodiments of the invention have been described, it is not intended that the invention be limited thereto, as it is intended that the invention be as broad in scope as the art will allow and that the specification be read likewise. Thus, while particular power supply arrangements have been disclosed, it will be appreciated that other power supply arrangements for the apparatus can be used as well. In addition, while particular types of circuitry and interfaces between circuit blocks have been disclosed, it will be understood that other circuit types and interfaces can be used. For example, and not by way of limitation, the microcontroller of the apparatus can be substituted by a microprocessor, one or more ASICs, one or more gate arrays, dedicated logic or other circuit elements. Similarly, some or all of the circuit elements can possibly be integrated together as part a System on a Chip. Furthermore, while a particular ring signal has been disclosed, it will be understood that any other ring signal that is used to announce a telephone call can be similarly used. This could include cell phones whose transmissions involved in announcing an incoming call could be detected. Moreover, while particular control configurations have been disclosed in reference to the record and play mode operations described herein, it will be appreciated that other control configurations could be used as well. It can also be used by others that are not hard of hearing. For example, hearing users may find it useful as a convenience feature because they no longer need to fumble for the remote control when the telephone rings. It will therefore be appreciated by those skilled in the art that yet other modifications could be made to the provided invention without deviating from its spirit and scope as claimed.

What is claimed is:

1. An apparatus for use with a television, a wireless remote control unit for remote control of the television, and a telephone line carrying a signal, the apparatus comprising:
   a wireless transmitter that provides a wireless interface to the television;
   a wireless receiver that provides a wireless interface to the wireless remote control unit;
   telephone line interface circuitry, operably coupled to the telephone line, that receives the signal carried on the telephone line;
   control circuitry, operably coupled to said telephone line interface circuitry, said wireless receiver, and said wireless transmitter, that operates in first and second modes; and
   power-conversion circuitry, operably coupled to the telephone line, that converts electrical energy of the signal carried on the telephone line to an appropriate DC voltage level for powering on at least portions of the apparatus;
   wherein in said first mode, at least one user-supplied remote control command for updating audio volume settings of the television is communicated wirelessly from said wireless remote control unit to said wireless receiver and stored for subsequent use;
   wherein in said second mode, in response to receipt of the signal by the telephone line interface circuitry, the at least one remote control command stored in the first mode is transmitted wirelessly by the wireless transmitter to the television for effectuating remote control operations that update audio volume settings of the television in conjunction with the signal being carried on the telephone line;
   wherein said apparatus is powered by a battery in said first mode; and
   wherein said first mode is selected by disconnecting the telephone line from the apparatus and connecting the battery to the apparatus, and said second mode is selected by disconnecting the battery from the apparatus and connecting the telephone line to the apparatus.

2. An apparatus according to claim 1, wherein:
said wireless transmitter and said wireless receiver support communication of infra-red wireless signals.

3. An apparatus according to claim 1, wherein:
said wireless transmitter and said wireless receiver support communication of radio frequency wireless signals.

4. An apparatus according to claim 1, wherein:
said portions of said apparatus that are powered by the power-conversion circuitry includes said wireless transmitter and said control circuitry.

5. An apparatus according to claim 1, wherein:
said control circuitry comprises a microcontroller.

6. An apparatus according to claim 1, further comprising:
non-volatile memory that persistently stores the at least one stored remote control command.

7. An apparatus according to claim 1, further comprising:
first and second parts that are interfaced to one another by a wireless interface therebetween, said first part including said telephone line interface circuitry, and said second part including said wireless transmitter, said wireless receiver and said control circuitry.

8. An apparatus according to claim 7, wherein:
said first part includes power-conversion circuitry for converting electrical energy of the signal carried on the telephone line to an appropriate DC voltage level for powering on components of said first part.

9. An apparatus according to claim 1, wherein:
said at least one remote control command is a television volume mute command.

* * * * *